(12) United States Patent
Andreaco et al.

(10) Patent No.: US 6,749,761 B1
(45) Date of Patent: Jun. 15, 2004

(54) METHOD FOR PRODUCING A HIGH RESOLUTION DETECTOR ARRAY

(75) Inventors: Mark S. Andreaco, Knoxville, TN (US); Charles W. Williams, Powell, TN (US); J. Clifton Moyers, Oak Ridge, TN (US); Keith Valgneur, Knoxville, TN (US)

(73) Assignee: CTI PET Systems, Inc., Knoxville, TN (US)

( * ) Notice: Subject to any disclaimer, the term of this patent is extended or adjusted under 35 U.S.C. 154(b) by 395 days.

(21) Appl. No.: 09/972,339

(22) Filed: Oct. 5, 2001

Related U.S. Application Data (60) Provisional application No. 60/239,145, filed on Oct. 10, 2000.

(51) Int. Cl.$^7$ .............................. B29D 11/00; G01T 1/24
(52) U.S. Cl. .................... 216/24; 250/362; 250/370.11; 250/371
(58) Field of Search ........................ 216/2, 24; 250/332, 250/362, 366, 367, 368, 369, 370.01, 370.11, 371

(56) References Cited

U.S. PATENT DOCUMENTS

| | | | |
|---|---|---|---|
| 4,750,972 A | | 6/1988 | Casey et al. |
| 4,879,465 A | * | 11/1989 | Persyk et al. .......... 250/363.02 |
| 5,378,894 A | * | 1/1995 | Akai ........................ 250/368 |
| 6,245,184 B1 | * | 6/2001 | Riedner et al. ............. 156/247 |

OTHER PUBLICATIONS

S. R. Cherry et al., "MicroPET: A High Resolution PET Scanner for Imaging Small Animals," IEEE Transactions on Nuclear Science, vol. 44, No. 3, 1161–1166, Jun. 1997.

C. L. Melcher et al., "Cerium–doped Lutetium Oxyorthosilicate: A Fast, Efficient New Scintillator," IEEE Transactions on Nuclear Science, vol. 39, No. 4, 502–505, 1992.

J.S. Huber et al., "Characterization of a 64 Channel PET Detector Using Photodiodes for Crystal Identification," IEEE Transactions on Nuclear Science NS–44, 1197–1201, 1997.

M. Pedrali–Noy et al., "PETRIC—A Positron Emission Tomography Readout Integrated Circuit," IEEE Transactions on Nuclear Science, vol. 48, No. 3, 479–484, Jun. 2001.

W. W. Moses et al., "The Electronics System for the LBNL Positron Emission Mammography (PEM) Camera," IEEE Transactions on Nuclear Science, vol. 48, No. 3, 632–636, Jun. 2001.

(List continued on next page.)

*Primary Examiner*—P. Hasanzadeh
*Assistant Examiner*—Roberts Culbert
(74) *Attorney, Agent, or Firm*—Pitts & Brittian, PC (57) ABSTRACT

A method for producing a high resolution detector array so as to provide very high packing fraction, i.e. the distance between scintillator elements is minimized so the detector efficiency will be higher than is currently achievable. In the preferred embodiment of the present invention, the fabrication methodology is enhanced by handling LSO bars rather than single crystals when gluing on the Lumirror® as well as etching the LSO. Namely, an LSO boule is cut into wide bars of a selected dimension, for example 30 mm, which are then acid etched or mechanically polished. A selected number, N, of these LSO bars can then be glued together with Lumirror® sheets between each bar (coating the LSO disks and Lumirror® sheets with Epotek 301-2). The glued bar block is then cut again into bars in a perpendicular direction, and these new LSO-Lumirror® bars are etched. Finally, a selected number, M, of these LSO-Lumirror® bars are glued together with Lumirror® sheets between each bar; thus creating an etched N×M LSO-Lumirror® array, (where M may or may not be equal to N), without having to handle individual LSO crystals or small Lumirror® pieces.

20 Claims, 9 Drawing Sheets

OTHER PUBLICATIONS

W. W. Moses et al., "PET Camera Designs for Imaging Breast Cancer and Axillary Nodeinvolvement," J. Nucl. Med., vol. 36, 69P, 1995.

K. Kurashige et al., "Surface Polishing of GSO Scintillator Using Chemical Process," IEEE Transactions on Nuclear Science, vol. 45, No. 3 522–524, 1998.

J. S. Huber et al., "Geometry and Surface Treatment dependence of the Light Collection from LSO Crystals," Nuclear Instruments and Methods in Physics Research A 437, 374–380, 1999.

W. W. Moses et al., "A "Winner–Take–All" IC for Determining the Crystal of Interactions in PET Detectors," IEEE Transactions on Nuclear Science, vol. 43, No. 3, 1615–1618, Jun. 1996.

* cited by examiner

Fig. 1

(PRIOR ART)

METHOD FOR PRODUCING A HIGH RESOLUTION DETECTOR ARRAY

CROSS-REFERENCE TO RELATED APPLICATIONS

This application claims the benefit of the filing date of Provisional Patent Application Serial No. 60/239,145, filed on Oct. 10, 2000.

STATEMENT REGARDING FEDERALLY SPONSORED RESEARCH OR DEVELOPMENT

Not Applicable

BACKGROUND OF THE INVENTION

1. Field of Invention

This invention pertains to a method of producing a scintillator detector arrays that may be used in various applications, such as, but not limited to, a PET detector module or nuclear physics applications. More specifically, it relates to a method of producing a high resolution detector array that can be coupled to photodetectors. In certain applications, the photodetector provides an accurate timing pulse and initial energy discrimination, identification of the crystal interaction, which may include the depth of interaction (DOI).

2. Description of the Related Art

When constructing scintillator arrays, it is known to use block scintillator arrays with sawcut grooves packed with reflector powder. However, this method is not feasible for producing arrays of individual crystals. It is also known to use reflector molds made of a white compound. However, it is often desired to produce light output with a greater depth dependence than these type of reflectors are capable of producing.

Finally, it is also known to hand wrap "plumbers" Teflon® tape around individual detectors as a standard reflector choice for research PET cameras. However, plumbers Teflon® tape is not a realistic choice for large cameras and/or cameras that use very small crystals. Further, hand wrapping individual crystals is both time consuming and difficult to do consistently. Hand wrapping with Teflon® tape also limits the reduction of crystal size for future cameras. In addition, plumbers Teflon® tape, or thicker 8 mil Teflon® tape, is not an ideal reflector. It stretches and creeps, so it can be difficult to accurately cover only the surface of each crystal not coupled to a photodetector. The Teflon® tape also becomes transparent when squeezed, which occurs when making a compact scintillator crystal array, and when glue wicks through it. Moreover, it is difficult to wrap the individual crystals tightly with thicker 8 mil Teflon® tape resulting in inaccurate measures of depth dependence.

What is missing from the art is a method of disposing a reflector between each individual crystal of a high resolution detector array which can efficiently, consistently and accurately cover the desired surfaces of an individual crystal. Accordingly, it is an object of the present invention to provide a method of producing a high resolution detector array having a reflector disposed between individual crystals of the array.

It is a further object of the present invention is to provide a method for producing a high resolution detector array efficiently, consistently and accurately covers the desired surfaces of an individual crystal.

Yet another the object of the present invention is to provide a method for producing a high resolution detector array which will provide very high packing fraction i.e. the distance between scintillator elements will be minimized so the detector efficiency will be higher than is currently achievable.

Still another object of the present invention is to provide a method for producing a high resolution detector array which eliminates the need to hand wrap individual crystals.

BRIEF SUMMARY OF THE INVENTION

In one embodiment of the present invention, the fabrication methodology is enhanced by handling LSO bars rather than single crystals when gluing on the Lumirror® as well as etching the LSO. Namely, an LSO boule is cut into bars of a selected dimension, for example 30 mm wide, which are then acid etched. A selected number, N, of these LSO bars can then be glued together with Lumirror® sheets between each bar (coating the LSO bars and Lumirror® sheets with Epotek 301-2). The glued bar block is then cut again into bars in a perpendicular direction, and these new LSO-Lumirror® bars are etched. Finally, a selected number, M, of these LSO-Lumirror® bars are glued together with Lumirror® sheets between each bar; thus creating an etched N×M LSO-Lumirror® array without having to handle individual LSO crystals or small Lumirror® pieces It will be appreciated by those skilled in the art that while M may be equal to N, M can also be greater than or less than N.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The detector designs produced by the method disclosed herein, along with its alternate embodiments, will enable finer spatial resolution than is achievable with current state of the art detector fabrication methodologies. The method can be utilized to produce a detector array comprised of a single scintillator material, or as described herein, can employ the use of two or more scintillator materials of different decay times. The decay times are used as one of the parameters in determining the scintillator elements loci in position space. Most current detector designs use the decay time for depth of interaction encoding (DOI). Variants of the new design would also be capable of providing this feature.

In general, the detector fabrication method will provide very high packing fraction i.e. the distance between scintillator elements will be minimized so the detector efficiency will be higher than is currently achievable. Another important feature of the design is that four times as many detector elements will be able to be resolved in position space with no increase in the number of optical detectors; the result will be that the intrinsic spatial resolution will be half of the current designs i.e. we will be able to spatially resolve smaller objects.

Figure 1:
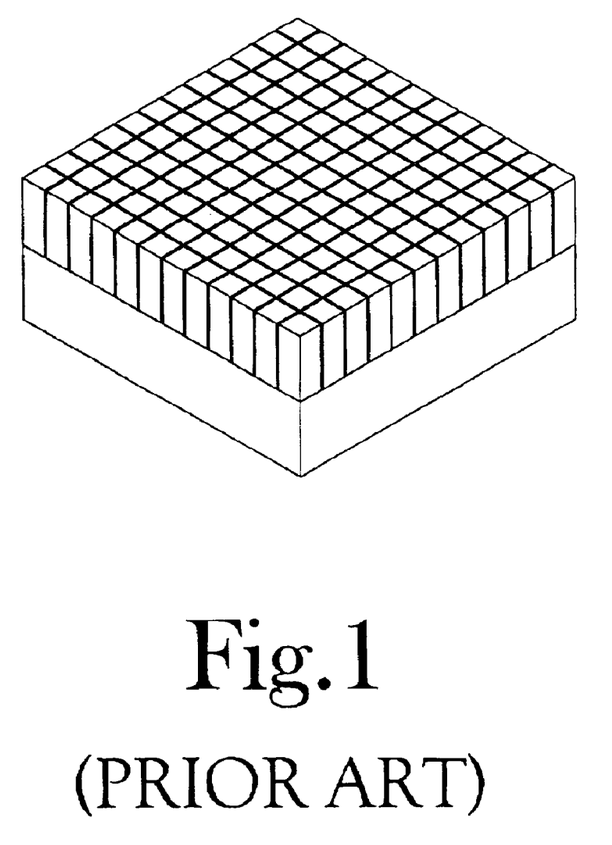
FIG. 1 is a perspective view of a detector array constructed in accordance with the prior art in which individual crystals are cut and adhered to a base material, such as a is light guide.
Figure 2A:
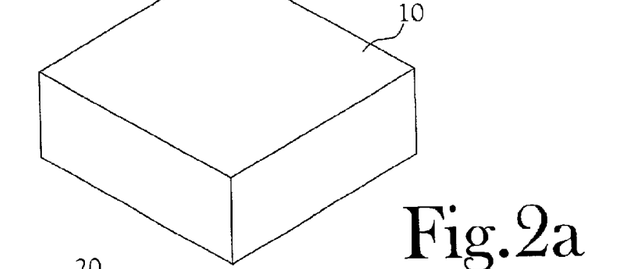
FIGS. 2a, 2b and 2c are a perspective view of the first steps of the method of the present invention utilizing a single scintillator material.
Figure 2B:
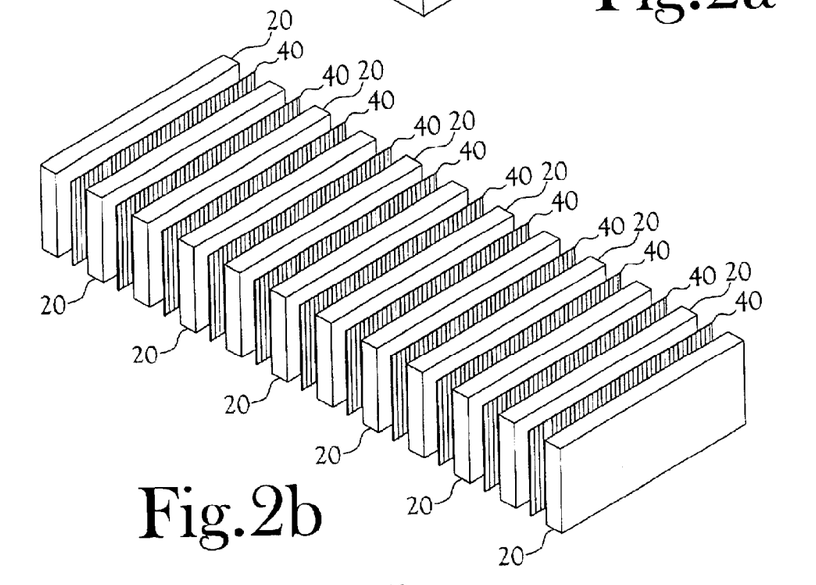
Figure 2C:
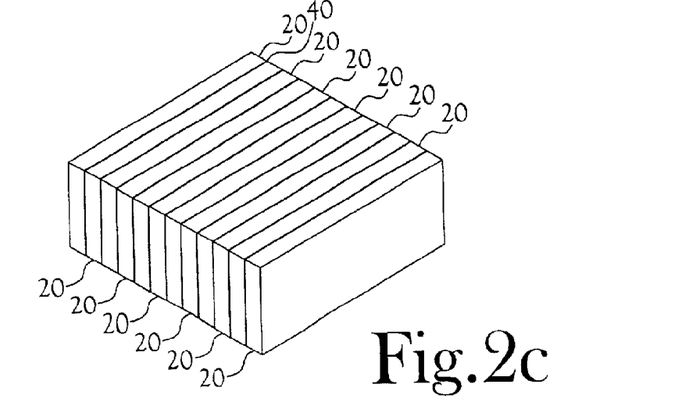
Figures 3A, 3B, 3C:
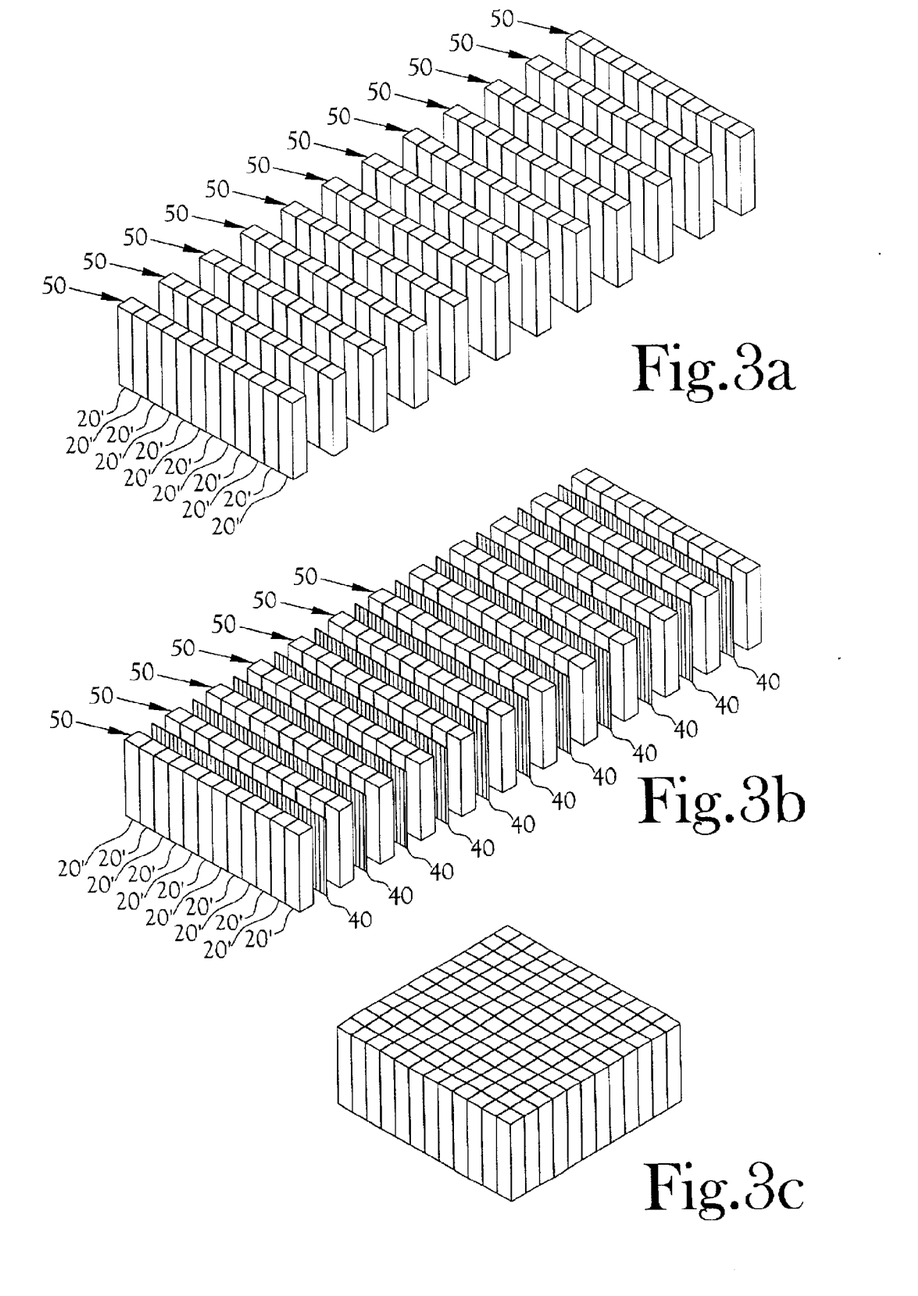
FIGS. 3a, 3b and 3c are a perspective view of the final steps of the method illustrated in FIGS. 2a, 2b and 2c and the detector array produced by such method.

According to one embodiment of the present invention, the method of the present invention entails the following steps. By way of example, it will be recognized that a prior art, standard block detector having dimensions of 52 mm wide×52 mm long×20 mm thick which is segmented into a 12×12 array has a crystal pitch of 4.3 mm and crystal size of 4.0 mm, as seen in FIG. 1 is constructed by arranging discrete cut scintillator crystal elements upon a substrate, resulting in large interstitial spaces which are typically packed with reflector powder. In contrast, according to the method of the present invention, a selected number, N, of bars of scintillator material are cut to a selected dimension, in one embodiment 52 mm long×2 mm wide×20 mm thick. In FIGS. 2 and 3, by way of example, the selected number of bars is twelve. It will be appreciated that while a 12×12 array is depicted in the figures, the method of the present invention could also be utilized to produce an 8×8 array, a 24×24 array, a 4×4 array etc. It will also be appreciated that the method could also be utilized to produce N×M arrays where M≠N. While the present method could be utilized to produce an N×M, (it being understood that M may or may not equal N), detector array of a single scintillator material (as illustrated in FIGS. 2a, 2b, 2c, 3a, 3b and 3c), in other embodiments, the method of the present embodiment could be utilized to produce detector arrays utilizing two different scintillator materials, (see FIGS. 4a, 4b, 4c, 5a, 5b and 5c), utilizing a stacked scintillator material having a first decay time $A_1$ and a second decay time $A_2$, (see FIGS. 6a, 6b, 6c, 7a, 7b and 7c) or utilizing two different scintillator materials in which the first scintillator material is a stacked scintillator material having a first decay time $A_1$ and a second decay time $A_2$ and the second scintillator material is a stacked scintillator material having a first decay time $B_1$ and a second decay time $B_2$, (see FIGS. 8a, 8b, 8c, 9a, 9b and 9c).

As illustrated in FIGS. 2–3, when producing a scintillation detector array from a single scintillator material, N bars 20 are cut from a block 10 of a selected scintillator material. The bars 20 in FIG. 2b would then be etched. It will be understood that the etching can be accomplished by either a chemically etch process (inexpensive approach) or a mechanical polishing process (expensive approach); either choice can be made. The etched bars are then coated with an epoxy of selected index of refraction, preferably Epotek 301-2 or Sylgard 186, a thin (50–200 micron) polyester film 40 loaded with a reflective material such as $CaCO_3$ or $TiO_2$ etc. is then bonded to the scintillator bar using the selected epoxy. The preferred embodiment film is Lumirror® by Toray Corporation. The scintillator bars are then laminated together. The pattern would be a layer of scintillator 20 followed by a layer of epoxy and thin reflector film 40, followed by a layer of scintillator 20. This process is repeated until all N layers are laminated together, See FIG. 2c. The assembly is then allowed to cure. Once fully cured the laminated block is subjected to a second sawing operation in which the laminated block is then cut into M bars 50 of a selected thickness by cutting across the laminated bars, see FIG. 3a. As stated above, M may or may not be equal to N. This results in m bars 50 of a selected dimensions, for example 2 mm wide×52 mm long×20 mm thick. Note though that in this case each bar contains N scintillator elements 20'. These N bars 50 are then etched. The etched bars are then coated with an epoxy of selected index of refraction and reflector film 40 is then bonded to the scintillator bar 50 using the selected epoxy, see FIG. 3b. The scintillator layers are then laminated together using the process described above, see FIG. 3c. The process results in an N×M scintillator element array. As stated above, the figures illustrate and exemplary 12×12 detector array. However, as has been stated, it will be appreciated that other array sizes, could be produced in accordance with the method of the present invention, and that M may or may not equal N.

Figure 4A:
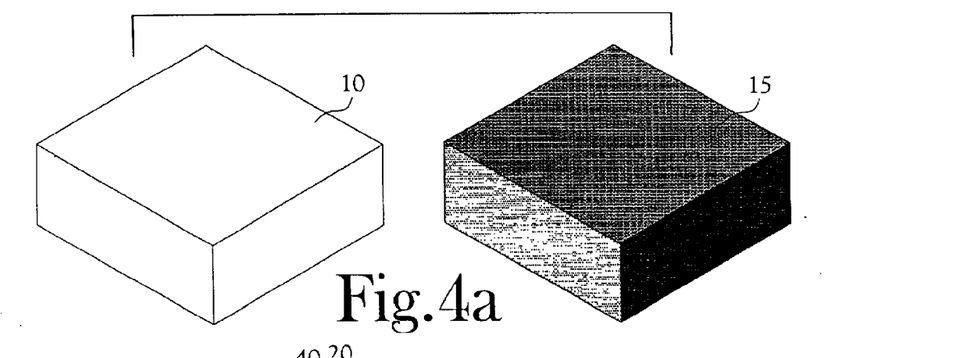
FIGS. 4a, 4b and 4c are a perspective view of the fist steps of an alternate embodiment of the method of the present invention utilizing two different scintillator materials.
Figure 4B:
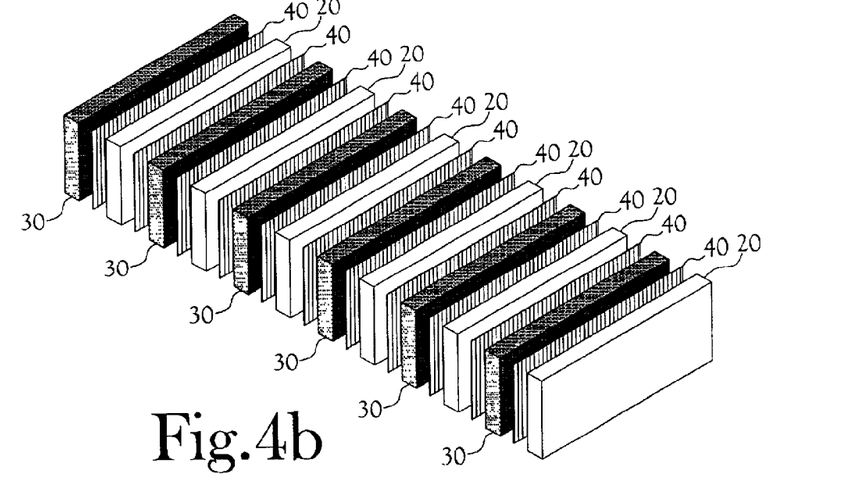
Figure 4C:
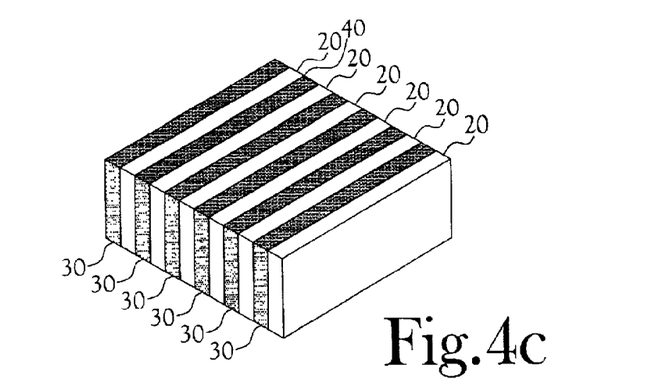
Figure 5A:
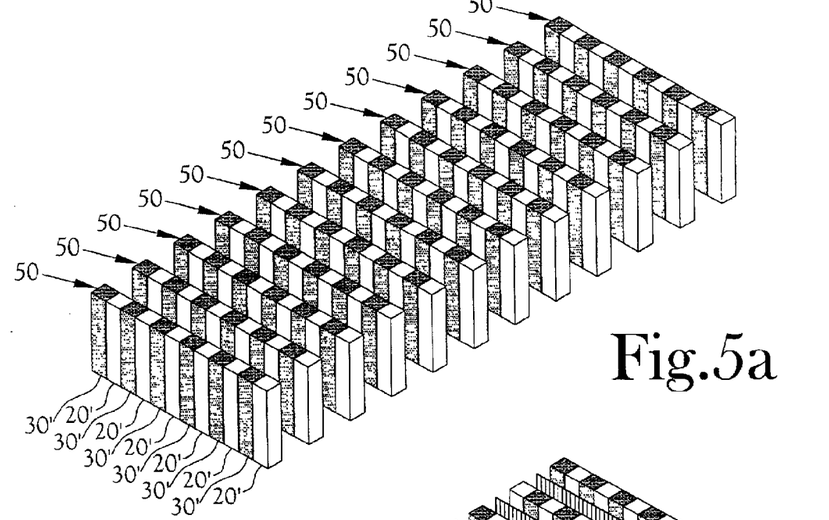
FIGS. 5a, 5b and 5c are a perspective view of the final steps of the method illustrated in FIGS. 4a, 4b and 4c and the detector array produced by such method.
Figures 5B, 5C:
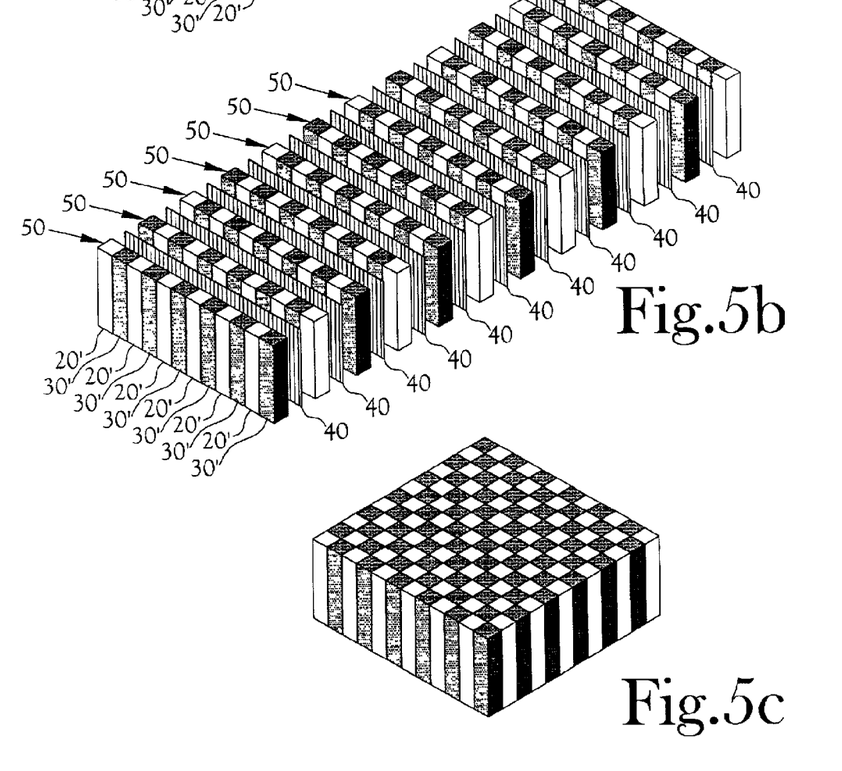

In another embodiment, illustrated in FIGS. 4–5, a detector array utilizing two different scintillator materials is produced. In this embodiment ½ N bars 20 are cut from a block 10 of a first selected scintillator material of a first selected decay time while ½ N bars are cut from block 15 of a second selected scintillator material of a second selected decay time. The bars 20 and 30 respectively in FIG. 4b would then be etched. The etched bars are then coated with an epoxy of selected index of refraction, preferably Epotek 301-2 or Sylgard 186, a thin (50–200 micron) polyester film 40 loaded with a reflective material such as $CaCO_3$ or $TiO_2$ etc. is then bonded to the scintillator bar using the selected epoxy. The preferred embodiment film is Lumirror® by Toray Corporation. The scintillator bars are then laminated together. The pattern would be a layer of scintillator 20, of decay time x, followed by a layer of epoxy and thin reflector film 40, followed by a layer of scintillator 30 of decay time y, followed by a layer of epoxy and thin reflector film 40 followed by a layer of scintillator 20 of decay time x. This process is repeated until all N layers are laminated together, See FIG. 4c. It being understood that the composite of the layer of scintillator 20 and the reflector film 40 is epoxied to the adjoining composite of scintillator 30 and reflector film 40 and so on. The assembly is then allowed to cure. Once fully cured the laminated block is subjected to a second sawing operation in which the laminated block is then cut into a selected number M bars 50 of a selected thickness by cutting across the laminated bars, see FIG. 5a. This results in M bars 50 of a selected dimension, for example 2 mm wide×52 mm long×20 mm thick. Note though that in this case each bar contains ½ N scintillator elements 20' and ½ N scintillator elements 30'. These M bars 50 are then etched. The etched bars are then coated with an epoxy of selected index of refraction and reflector film 40 is then bonded to the scintillator bar 50 using the selected epoxy, see FIG. 5b. The scintillator bars 50 are then laminated together using the process described above except that every other layer is rotated 180 degrees. This rotation results in a checkerboard pattern of alternating scintillation crystals of different decay times, see FIG. 5c. The process results in an N×M scintillator element array in which M may or may not equal N. Further, it will be appreciated that a detector array produced in accordance with the method of the present invention can be utilized in conjunction with light guides which may be either "active" or "inactive", segmented or continuous, and if segmented then either "inverted" or "non-inverted".

Figure 6A:
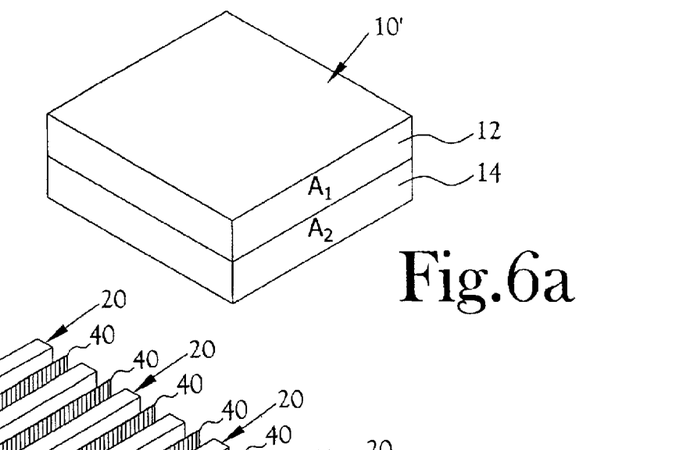
FIGS. 6a, 6b and 6c are a perspective view of the first steps of an additional alternate embodiment of the method of the present invention starting with a stacked scintillator material having a first decay time $A_1$ and a second decay time $A_2$.
Figures 6B, 6C:
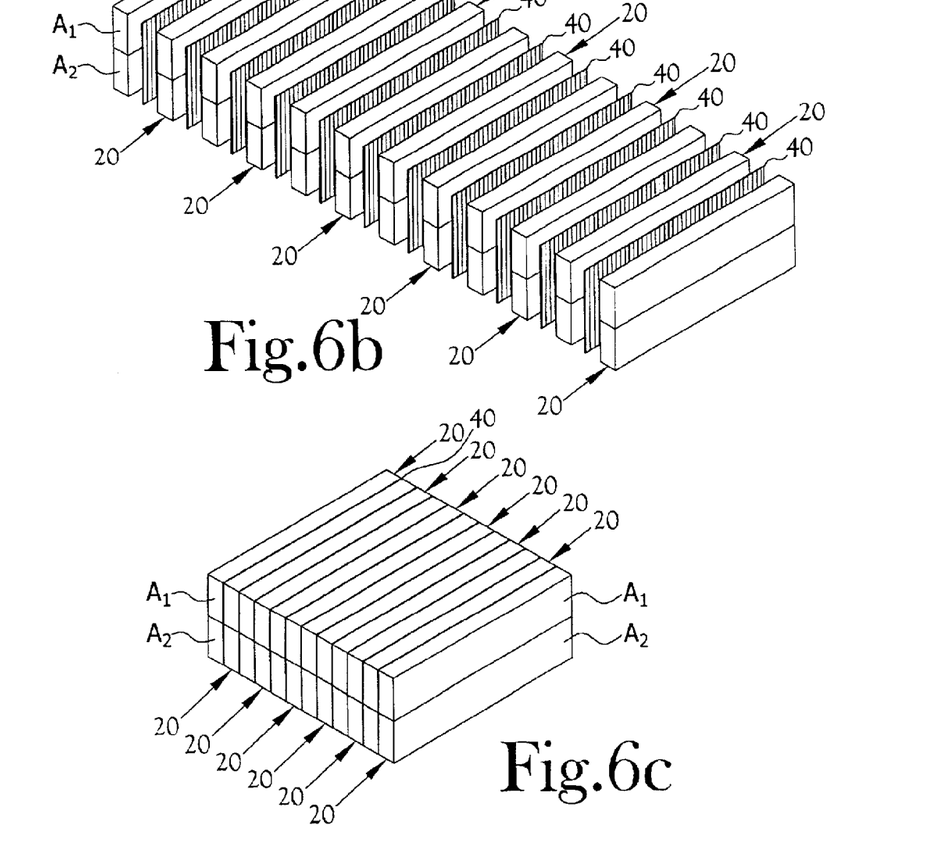
Figures 7A, 7B:
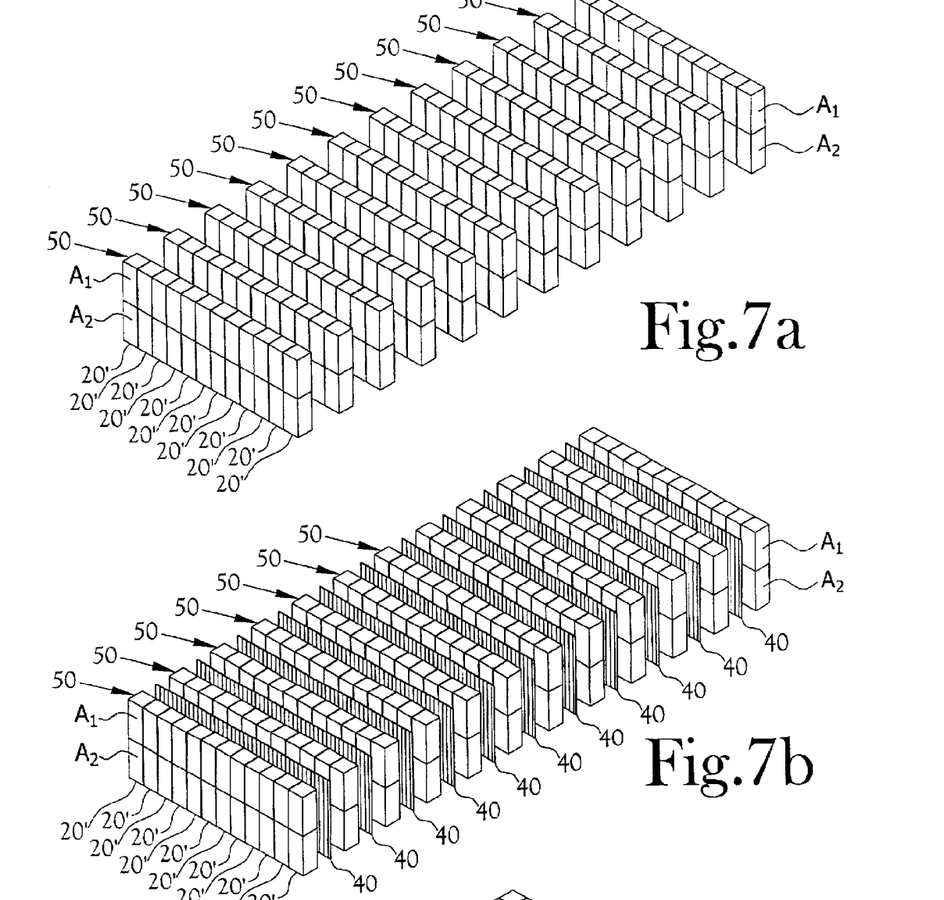
FIGS. 7a, 7b and 7c are a perspective view of the final steps of the method illustrated in FIGS. 6a, 6b and 6c and the detector array produced by such method.
Figure 7C:
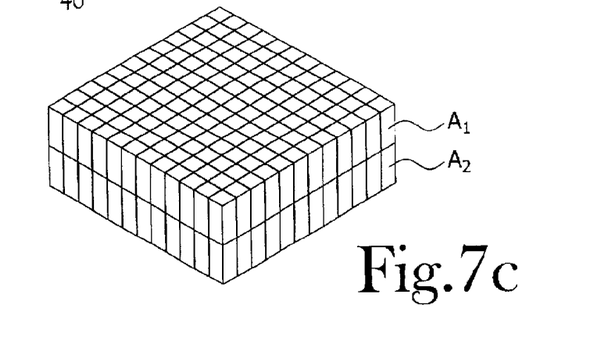

It will be recognized by those skilled in the art that the decay times of certain scintillator materials, Lutetium Oxyorthosilicate and Gadolinium Oxyorthosilicate to name a couple, are tuneable, such that a block of detector material could be constructed of a first block of a selected scintillator material having a selected decay time $A_1$ optically bonded to a second block of the same selected scintillator material having a decay time $A_2$. See FIG. 6a. As illustrated in FIGS. 6–7, when producing a scintillation detector array from a single scintillator material, N bars 20 are cut from a block 10' of a selected scintillator material. The block 10' is constructed of a first layer 12 of the selected scintillator material having decay time $A_1$ which is optically bonded to a second layer 14 of the selected scintillator material having decay time $A_2$. The bars 20 in FIG. 6b would then be etched. The etched bars are then coated with an epoxy of selected index of refraction, preferably Epotek 301-2 or Sylgard 186, a thin (50–200 micron) polyester film 40 loaded with a reflective material such as $CaCO_3$ or $TiO_2$ etc. is then bonded to the scintillator bar using the selected epoxy. The preferred embodiment film is Lumirror® by Toray Corporation. The scintillator bars are then laminated together, taking care not to invert the orientation of the layers with respect to decay time. The pattern would be a layer of scintillator bar 20 followed by a layer of epoxy and thin reflector film 40, followed by a layer of scintillator bar 20. This process is repeated until all N layers are laminated together, See FIG. 6c. The assembly is then allowed to cure. Once fully cured the laminated block is subjected to a second sawing operation in which the laminated block is then cut into M bars 50 of a selected thickness by cutting across the laminated bars, see FIG. 6a. As stated above, M may or may not be equal to N. This results in m bars 50 of a selected dimensions, for example 2 mm wide×52 mm long×20 mm thick. Note though that in this case each bar contains N scintillator elements 20'. These N bars 50 are then etched. The etched bars are then coated with an epoxy of selected index of refraction and reflector film 40 is then bonded to the scintillator bar 50 using the selected epoxy, see FIG. 6b. The scintillator layers are then laminated together using the process described above, see FIG. 6c. The process results in an N×M scintillator element array. As stated above, the figures illustrate and exemplary 12×12 detector array. However, as has been stated, it will be appreciated that other array sizes, could be produced in accordance with the method of the present invention, and that M may or may not equal N.

Figure 8A:
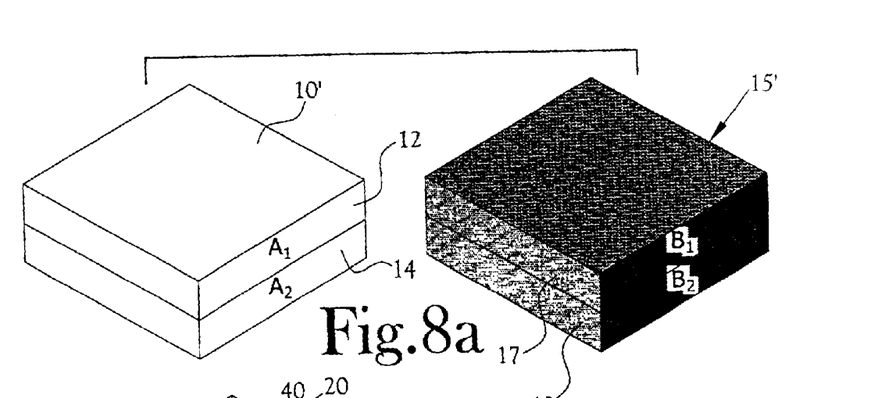
FIGS. 8a, 8b and 8c are a perspective view of the first steps of a further alternate embodiment of the method of the present invention utilizing a first stacked scintillator material having a first decay time $A_1$ and a second decay time $A_2$ and a second stacked scintillator material having a first decay time $B_1$ and a second decay time $B_2$.
Figure 8B:
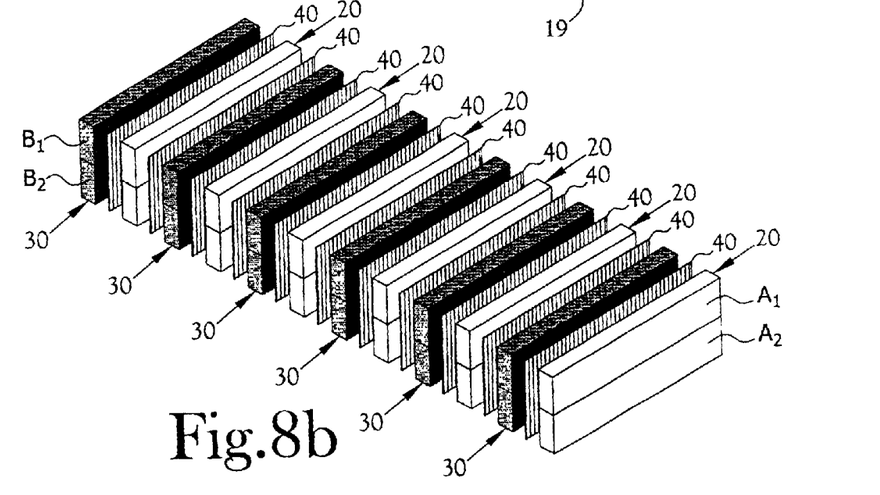
Figure 8C:
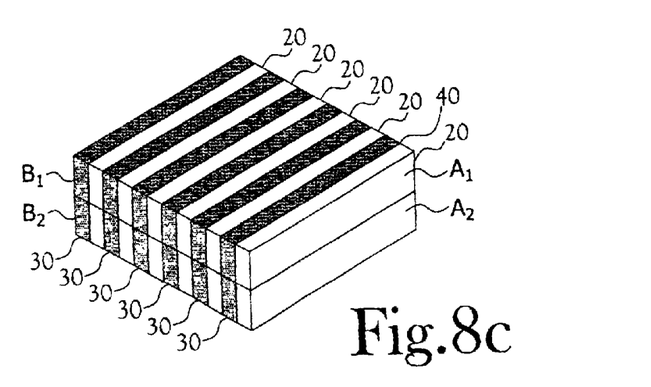
Figure 9A:
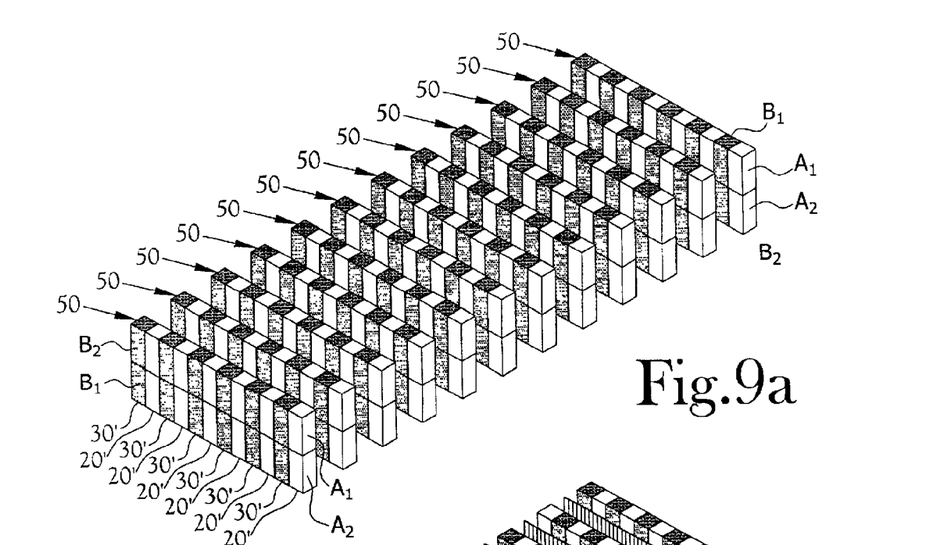
FIGS. 9a, 9b and 9c are a perspective view of the final steps of the method illustrated in FIGS. 8a, 8b and 8c and the detector array produced by such method.
Figures 9B, 9C:
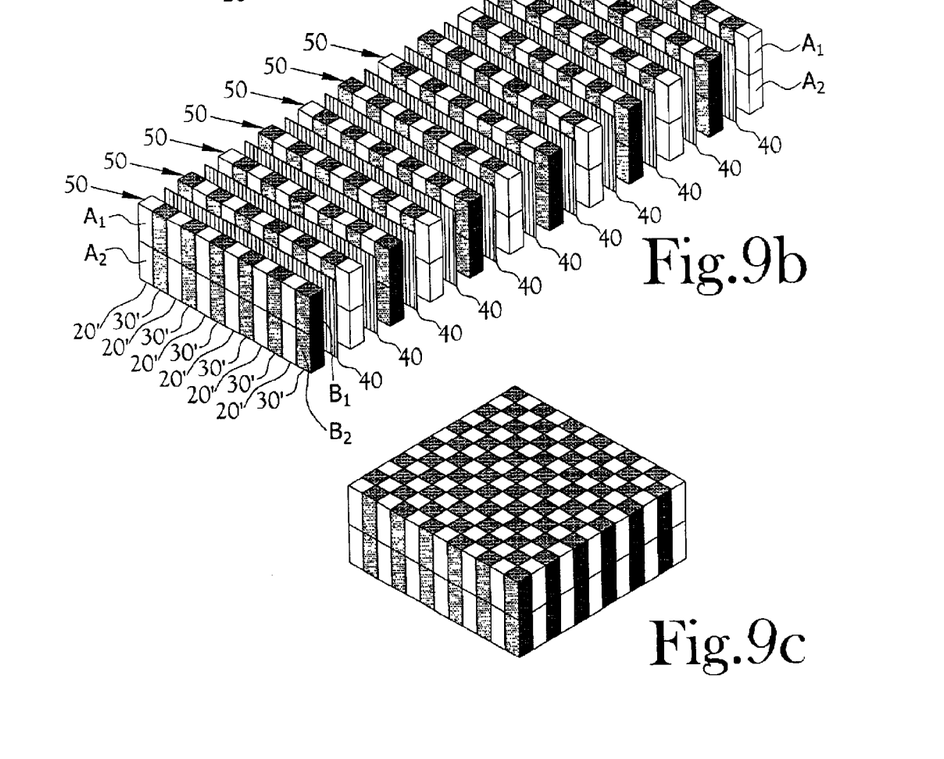

Further, as illustrated in FIGS. 8–9 a detector array utilizing two different scintillator materials in which the first scintillator material consists of a first block 12 of a selected scintillator material having a selected decay time $A_1$ optically bonded to a second block 14 of the same selected scintillator material having a decay time $A_2$, and the second scintillator material consists of a first block 17 of a selected scintillator material having a selected decay time $B_1$ optically bonded to a second block 19 of the same selected scintillator material having a decay time $B_2$. See FIG. 8a. In this embodiment ½ N bars 20 are cut from block 10' and ½ N bars 30 are cut from block 15'. The bars 20 and 30 respectively in FIG. 8b are then etched. The etched bars are then coated with an epoxy of selected index of refraction, preferably Epotek 301-2 or Sylgard 186, a thin (50–200 micron) polyester film 40 loaded with a reflective material such as $CaCO_3$ or $TiO_2$ etc. is then bonded to the scintillator bar using the selected epoxy. The preferred embodiment film is Lumirror® by Toray Corporation. The scintillator bars are then laminated together, again taking care not to invert the bars with respect to decay times. The pattern would be a layer of scintillator bar 20, followed by a layer of epoxy and thin reflector film 40, followed by a layer of scintillator bar 30, followed by a layer of epoxy and thin reflector film 40 followed by a layer of scintillator bar 20. This process is repeated until all N layers are laminated together, See FIG. 4c. It being understood that the composite of the layer of scintillator 20 and the reflector film 40 is epoxied to the adjoining composite of scintillator 30 and reflector film 40 and so on. The assembly is then allowed to cure. Once fully cured the laminated block is subjected to a second sawing operation in which the laminated block is then cut into a selected number M bars 50 of a selected thickness by cutting across the laminated bars, see FIG. 5a. This results in M bars 50 of a selected dimension, for example 2 mm wide×52 mm long×20 mm thick. Note though that in this case each bar contains ½ N scintillator elements 20' (of decay time $A_1$ and $A_2$) and ½ N scintillator elements 30' (of decay time $B_1$ and $B_2$) in alternating fashion. These M bars 50 are then etched. The etched bars are then coated with an epoxy of selected index of refraction and reflector film 40 is then bonded to the scintillator bar 50 using the selected epoxy, see FIG. 3b. The scintillator bars 50 are then laminated together using the process described above except that every other layer is rotated 180 degrees, again taking care that the bars are not inverted with respect to decay time. This rotation results in a checkerboard pattern of alternating scintillation crystals of different decay times, see FIG. 5c. The process results in an N×M scintillator element array in which M may or may not equal N.

From the foregoing description, it will be recognized by those skilled in the art that a method of disposing a reflector between each individual crystal of a high resolution detector array which can efficiently, consistently and accurately cover each of four sides of an individual crystal has been provided. In this regard, the present invention provides a method of producing a high resolution detector array having a reflector disposed between individual crystals of the array. Further, the present invention provides a method for producing a high resolution detector array which will provide very high packing fraction i.e. the distance between scintillator elements will be minimized so the detector efficiency will be higher than is currently achievable and which eliminates the need to hand wrap individual crystals.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A method for producing a high resolution detector array, said method comprising the steps:
   cutting a first selected number of bars of scintillator material to a selected dimension;
   etching said selected number of bars;
   coating said etched bars with an epoxy of a selected index of refraction;
   laminating said etched bars together, wherein a thin polyester film loaded with a reflective material is disposed between adjoining scintillator bars, wherein said thin film defines a reflector, whereby an assembly of laminated bars having a layer of said film between adjoining bars is formed;
   allowing said laminated assembly to cure;
   cutting a second group of said selected number of bars from said laminated assembly, wherein said cut is perpendicular to said etched bars, whereby each of said second group of cut bars comprises a laminated composite of said selected number of scintillator elements having a reflector interposed between adjoining scintillator crystals;
   etching said second group of said cut bars;
   coating said second group of etched bars with said epoxy of said selected index of refraction;
   laminating a second selected number of said second group of etched bars together, wherein a thin polyester film loaded with said reflective material is disposed between adjoining scintillator bars, wherein said thin film defines a reflector, whereby a detector array of discrete scintillator crystals having a reflector disposed between adjoining discrete scintillator elements is formed.

2. The method of claim 1 wherein each of said selected number of bars is cut from a single scintillator material.

3. The method of claim 1 wherein said first selected number of bars is equal to said second selected number of said second group of etched bars.

4. The method of claim 2 wherein said single scintillator material comprises a first layer having a first selected decay time optically bonded to a second layer having a second selected decay time.

5. The method of claim 1 wherein a first half of said first selected number of bars are cut from a scintillator material of a first selected decay time, and further wherein a second half of said first selected number of bars are cut from a scintillator material of a second selected decay time.

6. The method of claim 1 wherein a first half of said first selected number of bars are cut from a first scintillator material comprising a first layer having a first selected decay time optically bonded to a second layer having a second selected decay time, and further wherein a second half of said first selected number of bars are cut from a second scintillator material comprising a first layer having a first selected decay time optically bonded to a second layer having a second selected decay time.

7. The method of claim 1 wherein said steps of etching are carried out by chemically etching said selected number of bars.

8. The method of claim 1 wherein said steps of etching are carried out by mechanical polishing.

9. The method of claim 1 wherein said epoxy is selected from a group consisting of Epotek 301-2 and Sylgard 186.

10. The method of claim 5 wherein said step of laminating said etched bars together is carried out such that a bar of said scintillator of said first selected decay time adjoins a bar of scintillator material of said second decay time whereby bars of different decay times are laminated together in an alternating pattern.

11. The method of claim 1 wherein said reflective material is selected from a group consisting of $CaCO_3$ and $TiO_2$.

12. The method of claim 10 wherein said step of laminating said second group of etched bars together is carried out such that a checkerboard pattern of alternating scintillation crystals of different decay times is formed.

13. A method for producing a high resolution detector array, said method comprising the steps:
   cutting a first selected number of bars of scintillator material to a selected dimension, wherein a first half of said selected number of bars are cut from a scintillator material of a first selected decay time, and further wherein a second half of said selected number of bars are cut from a scintillator material of a second selected decay time;
   etching said selected number of bars;
   coating said etched bars with an epoxy of a selected index of refraction;
   laminating said etched bars together such that a bar of said scintillator of said first selected decay time adjoins a bar of scintillator material of said second decay time whereby bars of different decay times are laminated together in an alternating pattern, wherein a thin polyester film loaded with a reflective material is disposed between adjoining scintillator bars, wherein said thin film defines a reflector, whereby an assembly of laminated bars having a layer of said film between adjoining bars is formed;
   allowing said laminated assembly to cure;
   cutting a second group of said selected number of bars from said laminated assembly, wherein said cut is perpendicular to said etched bars, whereby each of said second group of cut bars comprises a laminated composite of said selected number of scintillator elements having a reflector interposed between adjoining scintillator crystals;
   etching said second group of said cut bars;
   coating said second group of etched bars with said epoxy of said selected index of refraction;
   laminating a second selected number of said second group of etched bars together, wherein a thin polyester film loaded with said reflective material is disposed between adjoining scintillator bars, wherein said thin film defines a reflector, wherein said step of laminating said second group of etched bars together is carried out such that a checkerboard pattern of alternating scintillation crystals of different decay times is formed, whereby a detector array of discrete scintillator crystals having a reflector disposed between adjoining discrete scintillator elements is formed.

14. The method of claim 13 wherein said first selected number of bars is equal to said second selected number of said second group of etched bars.

15. The method of claim 13 wherein said single scintillator material comprises a first layer having a first selected decay time optically bonded to a second layer having a second selected decay time.

16. The method of claim 13 wherein a first half of said first selected number of bars are cut from a first scintillator material comprising a first layer having a first selected decay time optically bonded to a second layer having a second selected decay time, and further wherein a second half of said first selected number of bars are cut from a second scintillator material comprising a first layer having a first selected decay time optically bonded to a second layer having a second selected decay time.

17. The method of claim 13 wherein said steps of etching are carried out by chemically etching said selected number of bars.

18. The method of claim 13 wherein said steps of etching are carried out by mechanical polishing.

19. The method of claim 13 wherein said epoxy is selected from a group consisting of Epotek 301-2 and Sylgard 186.

20. The method of claim 13 wherein said reflective material is selected from a group consisting of $CaCO_3$ and $TiO_2$.

* * * * *